(12) United States Patent
Hoog

(10) Patent No.: US 6,283,489 B1
(45) Date of Patent: Sep. 4, 2001

(54) ANTI-SWAY CONTROL DEVICE FOR TRAILERS

(76) Inventor: Josef Thomas Hoog, 252 Calle De La Selva, Novato, CA (US) 94949

(*) Notice: Subject to any disclaimer, the term of this patent is extended or adjusted under 35 U.S.C. 154(b) by 0 days.

(21) Appl. No.: 09/406,336

(22) Filed: Sep. 27, 1999

(51) Int. Cl.[7] .................................................. B60D 1/32
(52) U.S. Cl. .................... 280/455.1; 280/488; 280/461.1
(58) Field of Search ............................ 280/455.1, 446.1, 280/432, 461.1, 456.1, 488

(56) References Cited

U.S. PATENT DOCUMENTS

| | | | |
|---|---|---|---|
| 3,531,139 | * | 9/1970 | Hedgepeth . |
| 3,787,077 | * | 1/1974 | Sanders ............................ 280/446 B |
| 3,957,286 | * | 5/1976 | Goodwin .......................... 280/446 B |
| 4,278,267 | * | 7/1981 | Vasseur ............................ 280/406 R |
| 4,306,734 | * | 12/1981 | Swanson et al. ................. 280/446 B |
| 4,582,337 | * | 4/1986 | Hsueh .............................. 280/446 B |
| 5,222,754 | * | 6/1993 | Few .................................. 280/455.1 |
| 5,348,331 | * | 9/1994 | Hawkins .......................... 280/476.1 |

* cited by examiner

Primary Examiner—Brian L. Johnson
Assistant Examiner—Avraham H. Lerner
(74) Attorney, Agent, or Firm—Risto A. Rinne, Jr.

(57) ABSTRACT

An apparatus for reducing the sway of a trailer includes a first portion that is attached to a towing vehicle at any of several locations including an end portion of a receiver hitch, a bumper, a frame or body member, or by the use of a modified type of a drawbar having an offset member. A second portion is attached to a trailer at any of several locations including to a ball coupler by the use of an adapter plate, a modified ball coupler bracket, or directly to a tongue of the trailer. Intermediate the first and second portion at least one damper is disposed, preferably a hydraulic damper of the type that is generally used to form an automobile steering damper. The damper preferably includes spherical type bearings at each end thereof to allow for limited articulation about a point. A geometric arrangement (i.e., an angle) for the damper is provided whereby a sufficient dampening force is experienced the moment the trailer begins to deviate from normal. Alternative embodiments are described that increase the number of the hydraulic dampers that are utilized or affect the resistance they provide.

25 Claims, 5 Drawing Sheets

ANTI-SWAY CONTROL DEVICE FOR TRAILERS

BACKGROUND OF THE INVENTION

1. Field of the Invention

The present invention, in general relates to trailer hitches and, more particularly, to devices that prevent a trailer from swaying back and forth.

A number of anti-sway devices are currently known. These devices that have certain advantages and disadvantages. The disadvantages, which are discussed briefly hereinbelow, preclude their use in certain instances and prevent optimum results in other situations.

For example, certain currently known anti-sway devices will not function with surge type of brakes.

Other anti-sway types of devices will not function with load distributing types of hitches.

Other anti-sway types of devices require that a particular type of a hitch assembly, such as a receiver hitch, be used.

In addition, other types of anti-sway devices employ a limiting type of geometric design that actually permits the trailer to sway in a particular direction without initially presenting a significant opposing force. Rather, the geometry of certain prior types of devices is such that they become more effective as the trailer sways a greater distance away from normal but they are not especially effective at counteracting initial sway tendencies.

In general, prior types of anti-sway devices are also limited in how they can be attached to trailers, especially trailers with a single tongue.

Accordingly there exists today a need for an anti-sway control device for trailers that is versatile in its ability to attach to both the towing vehicle and the trailer, is suitable for use with surge brakes and weight distributing hitches, and possesses a geometry that provides optimum damping characteristics the moment a trailer begins to sway from normal.

Clearly, such a device would be useful and desirable.

2. Description of Prior Art

Sway control devices are, in general, known. For example, the following patents describe various types of these devices:

U.S. Pat. No. 3,273,911 to Waldie, Sep. 20, 1966;
U.S. Pat. No. 3,294,421 to Mathisen, Dec. 27, 1966;
U.S. Pat. No. 3,502,351 to Gray, Mar. 24, 1970;
U.S. Pat. No. 3,531,139 to Hedgepeth, Sep. 29, 1970;
U.S. Pat. No. 3,787,077 to Sanders, Jun. 22, 1974;
U.S. Pat. No. 3,796,288 to Hollnagel, Mar. 12, 1974;
U.S. Pat. No. 3,837,676 to Rendessy, Sep. 24, 1974;
U.S. Pat. No. 3,957,286 to Goodwin, May 18, 1976;
U.S. Pat. No. 4,306,734 to Swanson, et al, Dec. 22, 1981; and
U.S. Pat. No. 5,660,409 to Hensley, Aug. 26, 1997.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an anti-sway control device for trailers that can attach, in part, to a bumper, frame member, or body of a towing vehicle.

It is also an important object of the invention to provide an anti-sway control device for trailers that can attach, in part, to a receiver hitch of a towing vehicle.

Another object of the invention is to provide an anti-sway control device for trailers that can attach, in part, to a modified type of a drawbar that is attached to a receiver hitch of a towing vehicle.

Still another object of the invention is to provide an anti-sway control device for trailers that can attach, in part, to a ball coupler of a trailer.

Still yet another object of the invention is to provide an anti-sway control device for trailers that can attach, in part, to a ball coupler of a trailer that includes a surge type of a brake.

Yet another important object of the invention is to provide an anti-sway control device for trailers that can attach, in part, to a tongue of a trailer.

Still yet another important object of the invention is to provide an anti-sway control device for trailers that provides an improved geometric arrangement for the damper with respect to a longitudinal axis of the trailer.

It is a further object of the invention to provide an anti-sway control device for trailers that includes a hydraulic damper.

It is one further valuable object of the invention to provide an anti-sway control device for trailers that includes a friction-type of damper.

It is also an important further object of the invention to provide an anti-sway control device for trailers that includes a hydraulic steering type of a damper.

Another further object of the invention is to provide an anti-sway control device for trailers that can include a hydraulic damper on each side of a tongue of a trailer.

Still another further object of the invention is to provide an anti-sway control device for trailers that can include a pair of hydraulic dampers on either side of a tongue of a trailer.

Still yet another further object of the invention is to provide an anti-sway control device for trailers that can include a pair of hydraulic dampers on each side of a tongue of a trailer.

An additional object of the invention is to provide an anti-sway control device for trailers that includes a modified drawbar adapted for use with a receiver hitch.

An additional important object of the invention is to provide an anti-sway control device for trailers that includes an adapter plate suitable for attachment to an existing ball coupler.

Still yet another additional object of the invention is to provide an anti-sway control device for trailers that includes a modified type of a ball coupler.

Briefly, an anti-sway control apparatus for use with trailers that is constructed in accordance with the principles of the present invention has a first portion that is attached at an offset from a center longitudinal axis of a towing vehicle to the towing vehicle at any of several locations including an end portion of a receiver hitch, a bumper, a frame member, the body, or by the use of a modified type of a drawbar having an offset member. A second portion is attached to a trailer at any of several locations including to a ball coupler by the use of an adapter plate, a modified ball coupler bracket, or directly to a tongue of the trailer. Intermediate the first and second portion a damper is disposed, preferably a hydraulic damper of the type generally used to form an automobile steering damper. The damper preferably includes spherical type bearings at each end thereof to allow for limited articulation about a point. The magnitude and location of the offset by the first portion in combination with the location on the trailer that is selected for the second portion provide a geometric arrangement (i.e., an angle) whereby a sufficient dampening force is experienced the moment the trailer begins to deviate from normal. Alternative embodiments are described that increase the number of the hydraulic dampers that are utilized or the resistance they provide.

DETAILED DESCRIPTION OF THE INVENTION

Figure 1:
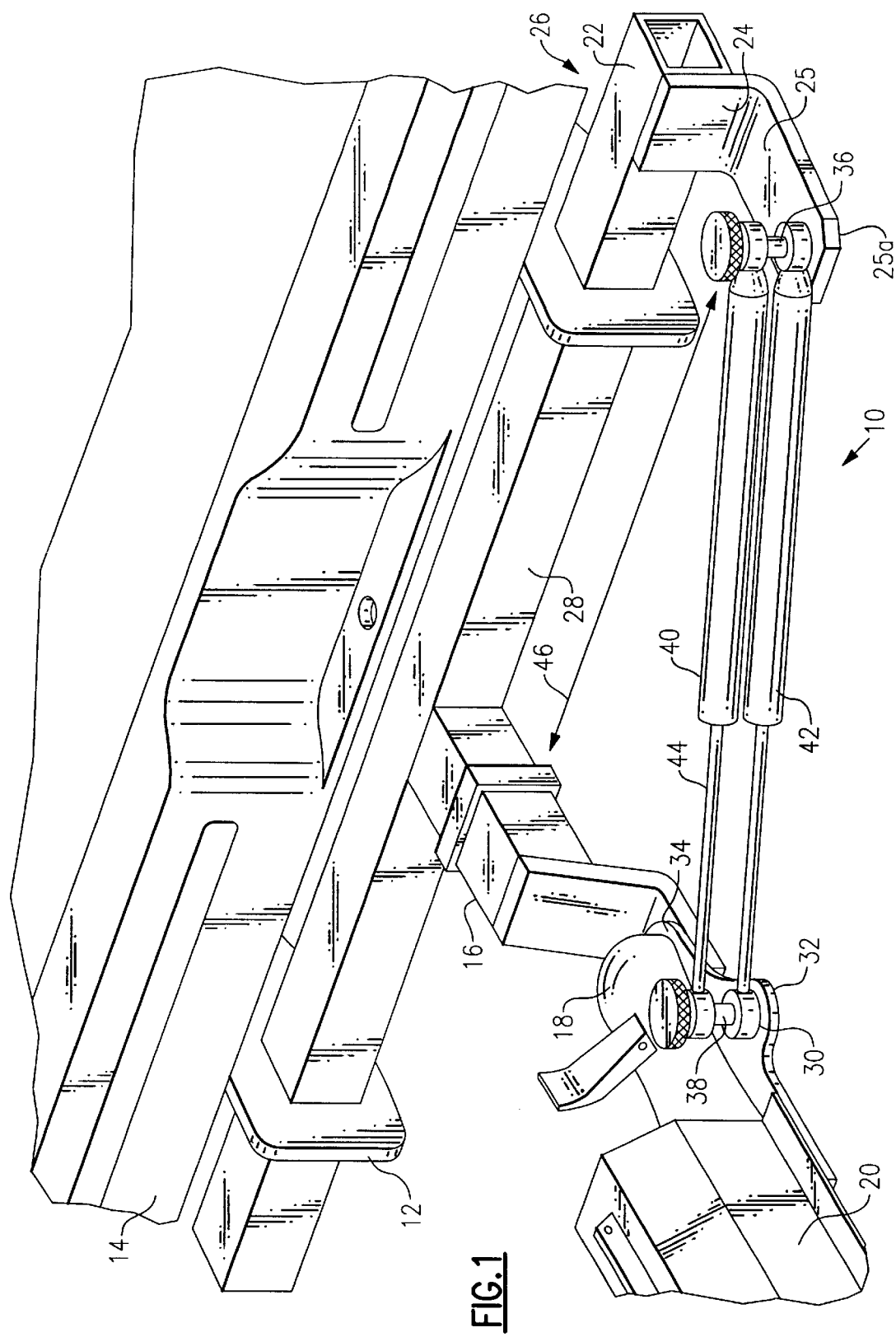
FIG. 1 is a view in perspective of an anti-sway control device for trailers having a first portion that is attached to an end portion of a receiver hitch and having a second portion that is attached to a modified ball coupler adapted for use with a surge type of a brake.

Referring to FIG. 1 is shown, an anti-sway control device for trailers, identified in general by the reference numeral 10.

A receiver hitch 12 is shown under a bumper 14 of a towing vehicle (not shown) and is typically attached to its frame (not shown). A standard drawbar 16 is inserted in the receiver hitch 12 to which a modified ball coupler 18 is attached thereto to a hitch ball (not shown). The hitch ball is attached to the standard drawbar 16.

The modified ball coupler 18 includes a surge brake mechanism 20 that is attached to a tongue of a trailer (not shown) as is well known in the trailer arts.

The modified ball coupler 18, as is described in greater detail hereinafter, can also be used with a standard ball coupler (See FIGS. 2 and 4).

The receiver hitch 12 includes an extension member 22 that extends a predetermined amount in a direction that is generally parallel with the bumper 14. The purpose of the extension member 22 is to make one end of the receiver hitch 12 wider than it would otherwise be. The reason for doing so is described in greater detail hereinbelow.

If desired, a second extension member (not shown) could be attached to the opposite end of the receiver hitch 12. The reason for installing the extension members 22 on both sides of the receiver hitch 12, as is described in greater detail hereinbelow, is to provide additional dampening capabilities for the anti-sway control for trailers 10.

This is useful when custom designing optimum anti-sway characteristics that are designed to more ideally match the type of trailer being towed and the anticipated conditions. For example, a heavy duty trailer used in a mountainous area might well benefit from use of the second extension member. The advantages of a second extension member are discussed in greater detail in the description appertaining to the embodiment shown in FIG. 4.

An offset bracket 24 is attached to an end of the extension member 22 that is disposed furthest from the center of the receiver hitch 12. The offset bracket 24 generally is a right-angle member that is welded to the extension member 22 and includes a plate 25 that is parallel with respect to a surface of the ground.

A first hole 25a is provided in the plate 25.

Together, the extension member 22 and the offset bracket 24 form an extension assembly, identified in general by the reference numeral 26.

The extension assembly 26 may be attached to the receiver hitch 12 by welding it thereto or by bolting it to the receiver hitch 12 or by any other preferred method.

Alternatively, the extension assembly 26 may be formed simply by lengthening a central member 28 of the receiver hitch 12 on one or both sides, as preferred, and attaching the offset bracket 24 thereto.

The modified ball coupler 18 includes a second hole 30. It may also include a third hole (not shown in this view) that is identical with the second hole 30 and disposed on the opposite side thereof (See FIG. 4).

The second hole 30 (and the third hole) is formed in a protruded portion 32 that is provided on a lip 34 of the modified ball coupler 18 and may include bolt threads, as is described in greater detail hereinafter.

A first mounting post 36 passes through the first hole 25a and a second mounting post 38 passes through the second hole 30 to which they are each secured. The part of the anti-sway control device for trailers 10 that is attached to the towing vehicle is generally referred to herein as a "first portion" and the part that is attached to the trailer is generally referred to herein as a "second portion".

Intermediate the first mounting post 36 and the second mounting post 38 is disposed a first damper 40 and an optional second damper 42. The second damper 42 is identical to the first damper 40 and is shown to illustrate that a plurality thereof may be utilized, as desired. Accordingly, any of the following description regarding the first damper 40 applies equally to the second damper 42.

The first and second dampers 40, 42 are, preferably, hydraulic devices, commonly referred to as shock absorbers. While it is possible to incorporate a friction-type of a damper (Refer to FIG. 7 and to related discussion hereinafter) with the anti-sway control device for trailers 10, the use of a hydraulic dampening device offers certain advantages that are discussed hereinbelow. Hydraulic shock absorbing dampers, in general, are also sometimes referred to as linear viscous dampers.

Certain of the various steering dampers (sometimes referred to as stabilizers) that are commercially available are well suited for this purpose and may be used to form the first and second dampers 40, 42.

There are various reasons why the use of a hydraulic shock absorbing device for the first and second dampers 40, 42 is generally preferred over the use of a friction-type of a device (see FIG. 7) as is commonly used in the anti-sway arts.

Any friction based device is subject to the natural laws of motion that provide for a higher static friction and a lower dynamic (i.e., moving) coefficient of friction. Accordingly, friction devices tend to diminish the resistance that they provide as soon as they are moved. When a trailer attempts to sway abruptly or as it attempts to sway to an excessive degree is precisely when maximum anti-sway characteristics are most needed.

A friction based device does not increase anti-sway forces in proportion to the speed or magnitude a trailer sways away from normal (i.e., away from alignment of its tongue with a longitudinal axis of the towing vehicle).

However a hydraulic device, if installed so as to exhibit optimal geometric alignment, offers increasing resistance to the sway of a trailer in proportion to the speed of sway of the trailer and the amount of sway. The reason for this is described in greater detail hereinafter.

The first and second dampers 40, 42 are disposed so as to maximize the amount of stroke experienced by a shaft 44 the moment the trailer begins to sway. In order to accomplish the preferred geometry, the first portion is attached to the towing vehicle at a substantial offset. The magnitude of the offset from a center longitudinal axis of the towing vehicle is identified in general by a first arrow 46. The offset 46 is set to the maximum amount practical for each installation and this amount depends upon many factors, such as the type of the towing vehicle, the type of the trailer, and the conditions experienced.

As a result of the geometry provided, the anti-sway control device for trailers 10 provides a resistive force that increases proportional to the velocity by which the trailer sways. If the trailer attempts a sudden sway, such as might be caused by a wind gust, the anti-sway control device for trailers 10 provides maximal resistance to that sway because of the greater speed at which the trailer attempts to sway side to side.

A faster rate of sway means a higher velocity for movement of the shaft 44 (and a piston [not shown] disposed therein). Faster motion by the piston attempts to move a greater quantity of hydraulic fluid contained within the first and second dampers 40, 42 at a faster rate. As is well known in the shock absorbing arts, this faster motion is resisted by a proportionally greater force within the first and second dampers 40, 42.

Furthermore, unlike prior designs where there is little if any motion the instant the trailer deviates from normal, the anti-sway control device for trailers 10 is effective at resisting sway at any position typically experienced by the trailer with respect to the towing vehicle. As such, there is no "dead band" or zone of diminished anti-sway capability.

It is also necessary to be able to quickly couple (i.e., to hitch) the trailer to the towing vehicle and to detach it therefrom. In order to do this, at least one end of the first and second dampers 40, 42 must be detached. Normally, the end that attaches to the first portion is removed so that the towing vehicle is unencumbered by the first and second dampers 40, 42.

Figure 6:
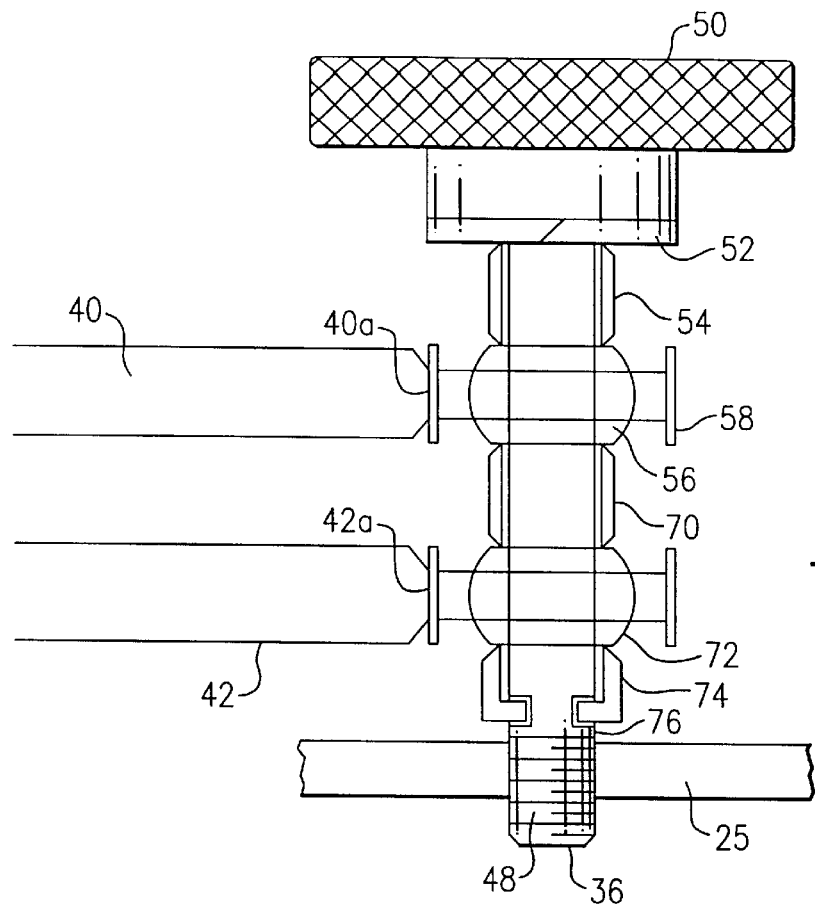
FIG. 6 is a side view of a first and second damper attached to a mounting post.

There are many possible ways to accomplish this of which FIG. 6 illustrates one such method. Referring now momentarily to FIG. 6, is shown the first mounting post 36 attached to the plate 25 of the offset bracket 24. A threaded portion 48 cooperates with threads in the plate 25.

A knurled knob 50 is used to tighten and loosen the first mounting post 36. A lock washer 52 secures the first mounting post 36 when it is tightened in place.

An upper spacer 54 is disposed concentrically over the first mounting post 36 and it bears upon a first spherical bearing 56 (Refer momentarily to FIG. 5 and for a more detailed description that is included hereinafter.) that is disposed in a mounting ring 58 that is attached at a first end 40a of the first damper 40. A second end 40b of the first damper 40 is attached to the shaft 44 and includes a similar second mounting ring (not shown) that is disposed over a similar second spherical bearing (not shown).

Figure 5:
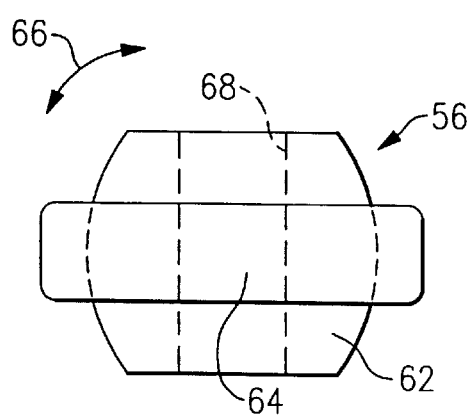
FIG. 5 is a side view of a spherical type of a bearing.

The first spherical bearing 56 is press-fit into the mounting ring 58. Referring momentarily now to FIG. 5, the first spherical bearing 56 includes an outer member 60 that secures an inner spherical member 62 captive. The inner spherical member 62 is free to rotate about a point 64 as indicated by a second arrow 66 in any direction a limited amount. The inner spherical member 62 includes a bore 68 therein that passes concentrically over the first mounting post 36.

Referring again to FIG. 6, an intermediate spacer 70 is disposed concentrically over the first mounting post 36 and it bears at an upper end upon the first spherical bearing 56 and at a lower end upon a second spherical bearing 72 that is attached to a first end 42a of the second damper 42.

A captive spacer 74 is disposed concentrically over the first mounting post 36 where it bears at an upper end on the second spherical bearing 72 and where it resides in a groove 76 that is formed in the first mounting post 36 proximate the threaded portion 48 thereof.

To remove the first and second dampers 40, 42 from the plate 25, the knurled knob 50 is simply unscrewed. To install it is threaded and tightened as desired, providing the various spacers are properly installed. If desired, a corresponding additional bracket (not shown) may be attached to the trailer tongue to which the first mounting post 36 is secured as soon as it is removed from the plate 25. This is accomplished by pivoting the first and second dampers 40, 42 rearward and extending or retracting the shaft 44 until alignment with a third hole (not shown) having corresponding threads in the additional bracket is attained.

Figure 2:
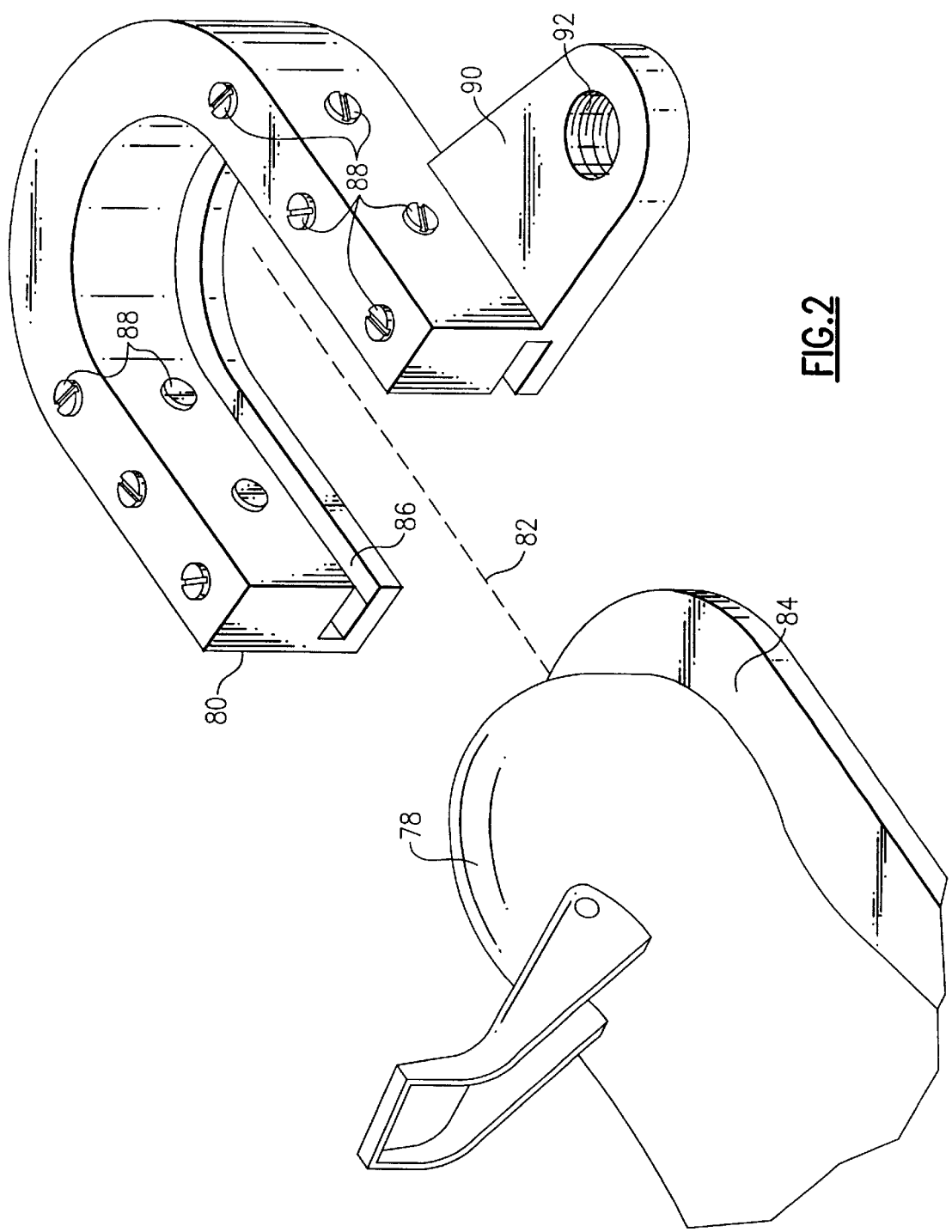
FIG. 2 is a view in perspective of a standard ball coupler and an adapter plate. The adapter plate is disposed slightly away from the standard ball coupler to reveal details of its construction.

Referring now to FIG. 2, a standard type of a ball coupler 78 is shown. An adapter plate 80 is shown disposed away from the standard coupler 78 to reveal details of its construction.

To attach it to the standard coupler 78 it is moved toward the standard coupler 78 along dashed line 82 until a standard lip 84 fits fully into a recess 86 that is formed along the interior perimeter of the adapter plate 80.

A plurality of set screws 88 in the adapter plate 80 bear against the standard lip 84 and other portions of the standard coupler 78 sufficient to retain the adapter plate 80 in position.

The adapter plate 80 includes an extended lip 90 that contains a threaded hole 92 that is adapted to cooperate with the threaded portion (not shown) of the second mounting post 38. It is noted that the first and second mounting posts 36, 38 are similarly constructed as would be any other additional mounting posts, if used.

Figure 3:
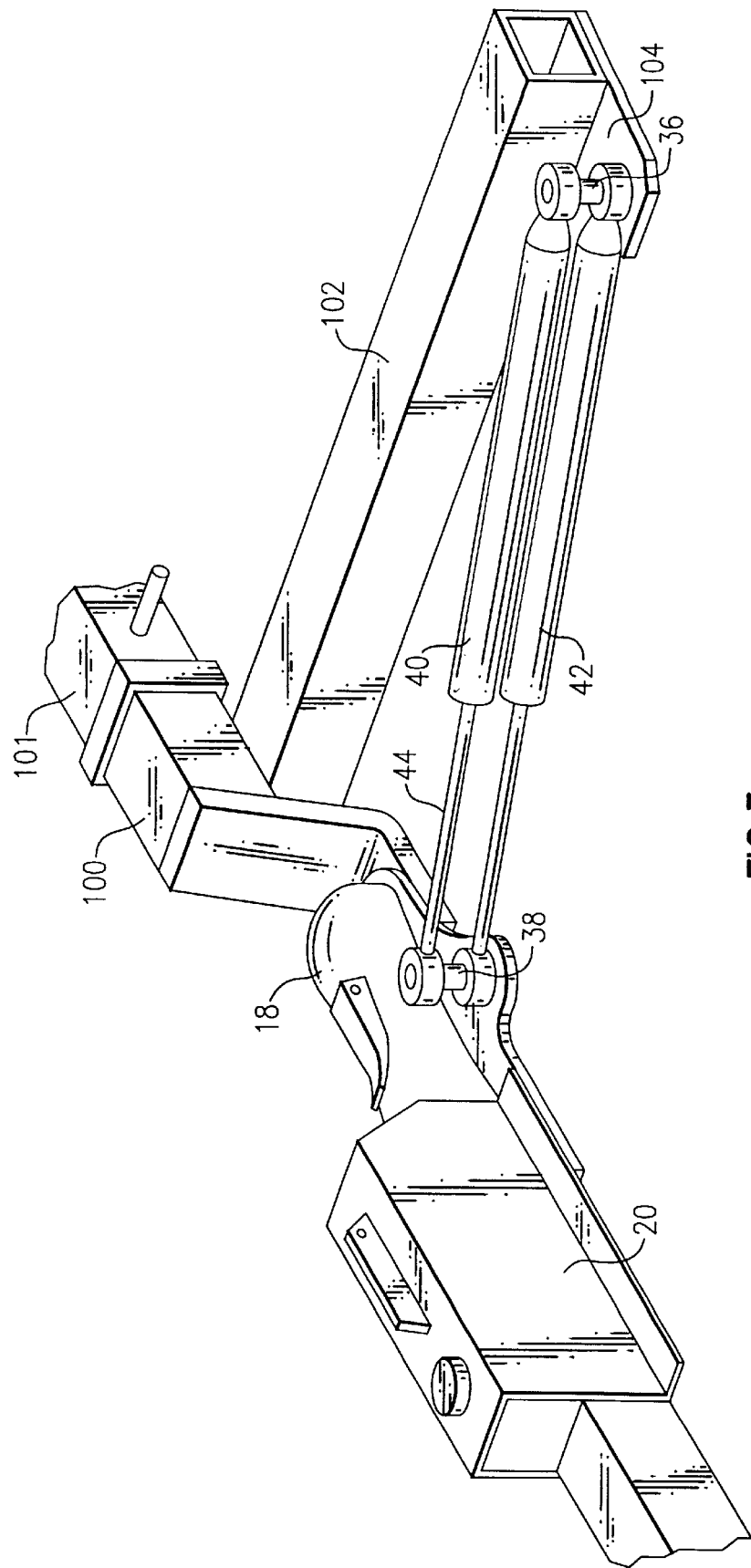
FIG. 3 is a view in perspective of an anti-sway control device for trailers having a first portion that is attached to a modified type of a drawbar having an offset member and having a second portion that is attached to a modified ball coupler adapted for use with a surge type of a brake.

It is also noted that methods of attaching the first and second mounting posts 36, 38 to the adapter plate 80 (or to the offset bracket 24, the protruded portion 32, or to a second offset bracket 104; see FIG. 3) other than by the use of the threaded hole 92, are anticipated.

For example, a bolt and nut (not shown) type of arrangement is possible. To facilitate the quick attachment and detachment of the anti-sway control device for trailers 10 to either the trailer or the towing vehicle, the use a quick-release (not shown) assembly is anticipated. The choice as to how to mount the first and second mounting posts 36, 38 to the adapter plate 80 (or other locations) are design prerogatives that those skilled in the art may make avail of after having first benefited from the disclosure as herein provided.

As such, the adapter plate 80 permits attachment of the second portion of the anti-sway control device for trailers 10 to the standard coupler 78. This allows use of the anti-sway control device for trailers 10 with a great many existing types of trailers.

Referring now to FIG. 3, a modified type of a drawbar 100 that includes an offset member 102 attached thereto, is shown. The modified drawbar 100 is inserted into a conventional receiver hitch 101.

A second offset bracket 104 is attached thereto and provides a mounting surface for similarly attaching the first mounting post 36 (i.e., the first portion) thereto.

The second portion is identical to that as described hereinabove for the modified ball coupler 18 (FIG. 1).

The use of the modified drawbar 100 allows use of the anti-sway control device for trailers 10 with the conventional receiver hitch 101. The conventional receiver hitch 101 does not have the extension assembly 26 attached thereto and would therefore provide no location to attach the first portion of the anti-sway control device for trailers 10.

Figure 4:
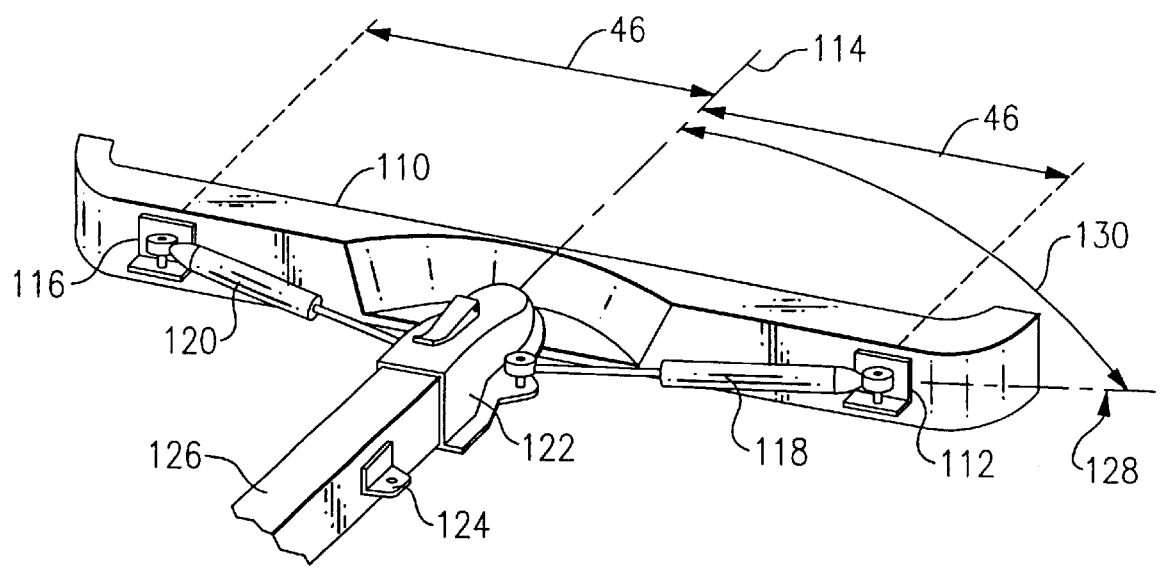
FIG. 4 is a view in perspective of an anti-sway control device for trailers having a first portion that is attached to a bumper of a towing vehicle on two sides and having a second portion that is attached to a specially modified ball coupler.

Referring now to FIG. 4, a second bumper 110 that is attached to the towing vehicle has the hitch ball attached directly to an aperture provided for that purpose on the second bumper 110. The second bumper 110 is often found as standard equipment on various pickup trucks, for example.

A third offset bracket 112 is attached at one side of the second bumper 110 an amount that is equal to the offset 46 from a central longitudinal axis 114. A fourth offset bracket 116 is attached at an opposite side of the second bumper 110 with respect to the third offset bracket 112 an amount that is also equal to the offset 46 from the central longitudinal axis 114.

The third and fourth offset brackets 112, 116 provide mounting locations for a first end of a third damper 118 and a fourth damper 120.

A specially modified ball coupler 122 includes a pair of extended lips on each side thereof that are adapted to receive a second end of the third and fourth dampers 118, 120 similar to that as was described hereinabove for the first and second dampers 40, 42.

If desired, the fourth damper 120 may be eliminated as may the fourth offset bracket 116. The use of the third offset bracket 116 attached to the second bumper 110 provides a way to utilize the anti-sway control device for trailers 10 when the towing vehicle does not include either the conventional receiver hitch 101 or the receiver hitch 12 having the extension assembly 26 attached thereto.

The use of the fourth damper 120 is possible with all embodiments herein described. As is well known in the hydraulic arts, hydraulic cylinders in general do not push an equal amount of fluid on the compression stroke as on the extension stroke. Cylinders move more fluid during compression. The reason for this is because the shaft 44 (FIG. 1) takes up space or area from the surface of the piston and accordingly, less fluid is displaced during extension of the shaft 44 than during its compression or retraction.

Although normally negligible, this difference does result in a change in anti-sway dampening characteristics depending upon which direction the trailer sways. When the trailer sways in a direction that attempts to compress the shaft 44, that is when it sways in a direction that is generally toward the shaft 44, more resistance is experienced than when the sway is in the opposite direction.

Accordingly, when the fourth damper 120 is utilized, a method is provided by which the dampening characteristics are identical regardless of the direction of sway by the trailer.

Also shown, a tongue adapter plate 124 is attached to a trailer tongue 126 where desired by bolting it or welding it in place, as preferred, to which the second end of the third damper 118 is attached. This provides an alternative method of attaching the second portion to the trailer.

When the trailer is being pulled straight ahead the trailer tongue 126 aligns with the central longitudinal axis 114. This is the normal position for towing. It changes only when turning or if sway of the trailer occurs relative to the towing vehicle. This is true for all embodiments herein described.

A second longitudinal axis 128 is shown passing through the third damper 118 and extending therefrom. When the trailer tongue 126 aligns with the central longitudinal axis 114 an angle is formed intermediate the central longitudinal axis 114 and the second longitudinal axis 128, as shown by an arc 130.

For the anti-sway control device for trailers 10 to function properly, the angle as shown by the arc 130 must be a positive angle. Minimally, it must be at least 15 degrees in magnitude. Preferably, it is set to be greater than 45 degrees in magnitude and ideally, approximately 68 degrees magnitude.

The angle as shown by the arc 130 will vary somewhat depending upon the embodiment and application. For example, it is affected by the location on the towing vehicle and also on the trailer where the anti-sway control device for trailers 10 is attached. Physical constraints by the trailer and towing vehicle may preclude obtaining an optimum setting for the angle as shown by the arc 130. In those instances, it is desirable to obtain a magnitude for the angle as shown by the arc 130 that is as close as possible to the preferred magnitude of 68 degrees.

The third and fourth offset brackets 112, 116 are shown attached to the second bumper 110. Alternatively, either or both of the third and fourth offset brackets 112, 116 may be attached wherever it is preferred directly to a frame member (not shown) of the towing vehicle (instead of the second bumper 110). This is preferred when the frame member is available for attachment to or if the operator does not wish to disfigure the second bumper 110.

Because certain of the available towing vehicles are "uni-body" construction, they may not have a convenient location for attachment of either of the third and fourth offset brackets 112, 116 to the frame member. In those instances, it is possible to attach them to a body member (not shown) at any convenient location on the towing vehicle.

Figure 7:
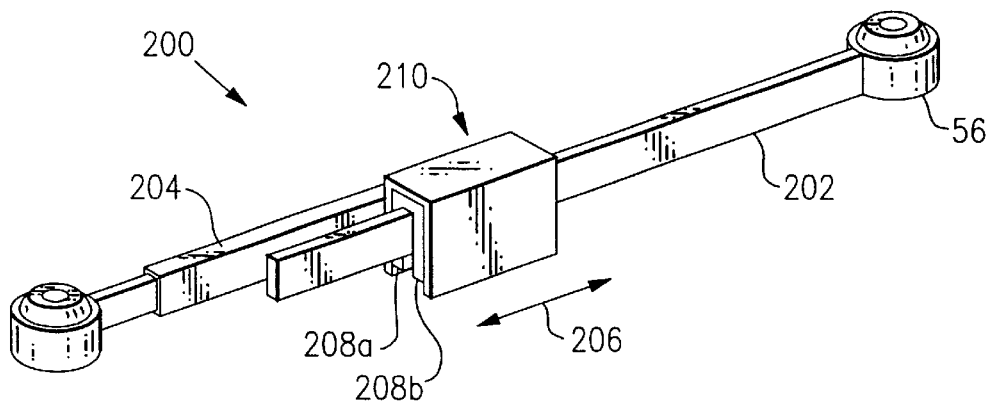
FIG. 7 is a view in perspective of a friction-type of a damper for alternative use with the anti-sway control device for trailers.

Referring now to FIG. 7, is shown a friction-type of a damper, identified in general by the reference numeral 200. The friction-type of a damper 200 is shown as an alternative to the various types of viscous linear dampers (hydraulic) that have been described hereinabove. Accordingly, the friction-type of a damper 200 may replace any of the first–fourth dampers 40, 42, 118, 120.

As mentioned hereinabove, the use of the friction-type of a damper 200 is generally not as effective as would be a viscous linear type of a damper, however it is acceptable for certain applications.

The friction-type of a damper 200 includes a first bar 202 that is adapted to move longitudinally in parallel planar alignment with a second bar 204 as shown by a directional arrow 206. A pair of pressure applying plates 208a, 208b are held in a fixed position relative to the second bar by a housing assembly 210.

The pair of pressure applying plates 208a, 208b bear upon the first bar 202 as it moves longitudinally as indicated by the directional arrow 206 thereby creating friction and resistance to the motion of the first bar 202 relative to the second bar 204. Means to adjust the amount of pressure exerted upon the first bar 202 by the pressure applying plates 208a, 208b are well known in the friction dampening arts and are therefore not described herein.

The first end of the friction-type of a damper 200 includes the first spherical bearing 56 for attachment to the towing vehicle and the second end includes the second spherical damper (not shown) for attachment to the trailer.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

As such an example, the use of a pintle type of a hitch coupling may be used instead of the hitch ball.

What is claimed is:

1. An anti-sway control device for use with a trailer and a towing vehicle, comprising:
   (a) means for attaching a first portion to said towing vehicle at an offset from a center longitudinal axis of said towing vehicle;
   (b) means for attaching a second portion to said trailer; and
   (c) means for providing at least one damper intermediate said first portion and said second portion;
      wherein said means for attaching a first portion to said towing vehicle includes extension means attached to an end of a receiver hitch; and
      wherein said extension means includes an extension member attached to said receiver hitch that extends a predetermined amount in a direction that is generally perpendicular with respect to said center longitudinal axis and which includes a first offset bracket that is attached to an end of said extension member at a location that is disposed furthest away from said center longitudinal axis.

2. The device of claim 1 wherein said means for providing at least one damper is a linear viscous damper.

3. The device of claim 1 wherein said means for providing at least one damper is a friction-type damper.

4. The device of claim 1 wherein said offset bracket includes a threaded hole.

5. The device of claim 4 wherein said threaded hole is adapted to receive a first mounting post therein, said first mounting post being adapted to retain a first end of said means for providing a damper thereto.

6. The device of claim 1 wherein said means for attaching a first portion to said towing vehicle includes a modified drawbar that includes an offset member attached thereto, said offset member extending a predetermined amount in a direction that is generally perpendicular with respect to said center longitudinal axis and including means for attaching a first end of said means for providing a damper thereto.

7. The device of claim 6 wherein said means for attaching a first end of said means for providing a damper includes a second offset bracket attached to said offset member at a location that is disposed generally furthest away from said center longitudinal axis and wherein said second offset bracket includes an aperture that is adapted to receive a first mounting post therein, said first mounting post being adapted to retain said first end of said means for providing a damper thereto.

8. The device of claim 1 wherein said means for attaching a first portion to said towing vehicle includes a third offset bracket that is adapted to be attached to a bumper of said towing vehicle at a location that is disposed a predetermined distance away from said center longitudinal axis.

9. The device of claim 8 wherein said third offset bracket includes an aperture that is adapted to receive a first mounting post therein, said first mounting post being adapted to retain a first end of said means for providing a damper thereto.

10. The device of claim 1 wherein said means for attaching a first portion to said towing vehicle includes a plurality of said means for attaching a first portion to said towing vehicle.

11. The device of claim 1 wherein said means for attaching a second portion to said trailer includes a modified ball coupler, said modified ball coupler including a protruded portion on at least one side thereof that contains an aperture that is adapted to receive a second mounting post therein, said second mounting post being adapted to retain a second end of said means for providing a damper thereto.

12. The device of claim 1 wherein said means for attaching a second portion to said trailer includes an adapter plate, said adapter plate including means for attaching to a ball coupler and means for attaching a second end of said means for providing a damper thereto.

13. The device of claim 12 wherein said means for attaching a second end of said means for providing a damper includes an extended lip attached to said adapter plate that contains an aperture that is adapted to receive a second mounting post therein, said second mounting post being adapted to retain a second end of said means for providing a damper thereto.

14. The device of claim 1 wherein said trailer is adapted to be attached to said towing vehicle by a ball hitch.

15. The device of claim 1 wherein said trailer is adapted to include a surge brake.

16. The device of claim 1 wherein said means for providing at least one damper includes a plurality of dampers.

17. The device of claim 16 wherein said plurality of dampers are disposed on one side of said center longitudinal axis.

18. The device of claim 16 wherein at least one of said plurality of dampers are disposed on each side of center longitudinal axis.

19. The device of claim 1 wherein said means for providing at least one damper includes a shock absorber.

20. The device of claim 1 wherein said means for providing at least one damper includes a steering damper.

21. The device of claim 1 wherein said means for providing at least one damper includes at least one spherical bearing disposed at an end thereof and wherein said spherical bearing is adapted to permit rotation about a point.

22. The device of claim 1 wherein said means for providing at least one damper intermediate said first portion and said second portion is disposed at a positive angle with respect to said center longitudinal axis when said towing vehicle is pulling said trailer straight ahead.

23. The device of claim 22 wherein said positive angle is at least 15 degrees in magnitude.

24. The device of claim 22 wherein said positive angle is at least 45 degrees in magnitude.

25. The device of claim 22 wherein said positive angle is approximately 68 degrees in magnitude.

* * * * *